United States Patent
Alahyari et al.

(10) Patent No.: US 12,012,892 B1
(45) Date of Patent: Jun. 18, 2024

(54) WATER SEPARATOR FOR TURBINE ENGINE

(71) Applicant: Raytheon Technologies Corporation, Farmington, CT (US)

(72) Inventors: Abbas A. Alahyari, Glastonbury, CT (US); Jon E. Sobanski, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/199,767

(22) Filed: May 19, 2023

(51) Int. Cl.
*F02C 7/143* (2006.01)
*F02C 7/052* (2006.01)

(52) U.S. Cl.
CPC .............. *F02C 7/052* (2013.01); *F02C 7/143* (2013.01); *F05D 2260/213* (2013.01); *F05D 2260/609* (2013.01)

(58) Field of Classification Search
CPC .... F02C 7/052; F02C 7/143; F05D 2260/213; F05D 2260/602; F05D 2260/609
See application file for complete search history.

(56) References Cited

U.S. PATENT DOCUMENTS

| | | | |
|---|---|---|---|
| 3,266,564 A | 8/1966 | Sabatiuk | |
| 3,604,207 A | 9/1971 | Waidelich | |
| 3,646,760 A | 3/1972 | Waidelich | |
| 6,641,084 B1 * | 11/2003 | Huber | H01M 8/00 429/496 |
| 6,834,831 B2 * | 12/2004 | Daggett | H01M 8/04089 429/495 |
| 10,184,372 B2 | 1/2019 | Shin | |
| 2004/0103637 A1 * | 6/2004 | Maisotsenko | F28D 5/02 60/39.59 |
| 2016/0075439 A1 * | 3/2016 | Mores | F02C 7/052 244/53 B |
| 2023/0035231 A1 | 2/2023 | Hu | |

FOREIGN PATENT DOCUMENTS

RU 2285131 C1 10/2006

* cited by examiner

*Primary Examiner* — Steven M Sutherland
(74) *Attorney, Agent, or Firm* — Getz Balich LLC

(57) ABSTRACT

A turbine engine is provided that includes a turbine engine core, a water separate and a core flowpath. The turbine engine core includes a core compressor section, a core combustor section and a core turbine section. The water separator includes a flowpath duct and a collector duct. The flowpath duct extends axially along and circumferentially about an axis. The collector duct extends axially along and circumferentially about the flowpath duct. The collector duct is fluidly coupled with the flowpath duct through a water permeable region in an outer wall of the flowpath duct. The core flowpath extends through the core compressor section, the core combustor section, the core turbine section and the flowpath duct from an inlet into the core flowpath to an exhaust from the core flowpath. The core flowpath extends axially along the water permeable region within the flowpath duct.

20 Claims, 9 Drawing Sheets

WATER SEPARATOR FOR TURBINE ENGINE

GOVERNMENT LICENSE RIGHTS

This invention was made with Government support under Contract DE-AR0001561 awarded by the United States Department of Energy, Office of ARPA-E. The Government has certain rights in the invention.

BACKGROUND OF THE DISCLOSURE

1. Technical Field

This disclosure relates generally to a turbine engine and, more particularly, to recovering water from combustion products of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor, and exhausted combustion products carry waste heat energy. Various systems and methods are known in the art for recovering the water vapor and/or the heat energy. While these known systems and methods have various advantages, there is still room in the art for improvement.

SUMMARY OF THE DISCLOSURE

According to an aspect of the present disclosure, a turbine engine is provided that includes a turbine engine core, a water separate and a core flowpath. The turbine engine core includes a core compressor section, a core combustor section and a core turbine section. The water separator includes a flowpath duct and a collector duct. The flowpath duct extends axially along and circumferentially about an axis. The collector duct extends axially along and circumferentially about the flowpath duct. The collector duct is fluidly coupled with the flowpath duct through a water permeable region in an outer wall of the flowpath duct. The core flowpath extends through the core compressor section, the core combustor section, the core turbine section and the flowpath duct from an inlet into the core flowpath to an exhaust from the core flowpath. The core flowpath extends axially along the water permeable region within the flowpath duct.

According to another aspect of the present disclosure, an assembly is provided for a turbine engine. This assembly includes a plurality of condenser modules, a water separator and a flowpath. The condenser modules are arranged circumferentially about an axis. The condenser modules include a first condenser module and a second condenser module. The water separator includes a flowpath duct and a collector duct radially outboard of flowpath duct. The collector duct is fluidly coupled with the flowpath duct through a water permeable region in an outer wall of the flowpath duct. The flowpath includes a plurality of parallel legs arranged circumferentially about the axis. The parallel legs include a first leg and a second leg. The first leg extends through the first condenser module to the flowpath duct. The second leg extends through the second condenser module to the flowpath duct.

According to still another aspect of the present disclosure, an apparatus is provided for a turbine engine. This apparatus includes a water separator, and the water separator includes a flowpath duct and a collector duct. The flowpath duct extends axially along and circumferentially about an axis. The collector duct extends axially along and circumferentially about the flowpath duct. The collector duct is fluidly coupled with the flowpath duct through a plurality of water permeable regions in an outer wall of the flowpath duct. The water permeable regions are spaced axially along the axis. Each of the water permeable regions extends circumferentially about the axis. The water separator is configured to passively separate water from other combustion products flowing through the flowpath duct. The water separator is configured to direct the water through the water permeable regions into the collector duct.

The assembly may also include a turbine engine core. The turbine engine core may include a core compressor section, a core combustor section and a core turbine section. A portion of the flowpath, which is upstream of the plurality of parallel legs, may extend through the core compressor section, the core combustor section and the core turbine section.

The assembly may also include a plurality of evaporator modules arranged circumferentially about the axis. The evaporator modules may include a first evaporator module and a second evaporator module. The first condenser module may be radially outboard of the first evaporator module. The second condenser module may be radially outboard of the second evaporator module. The first leg may extend through the first evaporator module and the first condenser module to the flowpath duct. The second leg may extend through the second evaporator module and the second condenser module to the flowpath duct.

The water separator may be configured to: separate water from other combustion products flowing through the flowpath duct; and direct the water through the water permeable region into the collector duct.

The turbine engine may also include a recovery system, and the recovery system may include the water separator and an evaporator. The recovery system may be configured to evaporate at least some the water to provide steam using the evaporator. The recovery system may be configured to direct the steam to one or more components of the turbine engine core.

The water permeable region may include a gutter.

The water permeable region may include a channel. The channel may project radially, in a radial outward direction, into the outer wall of the flowpath duct. The channel may extend circumferentially about the core flowpath within the outer wall of the flowpath duct.

The water permeable region may include a scoop.

The water permeable region may include a plurality of perforations radially through the outer wall of the flowpath duct.

The outer wall of the flowpath duct may also be configured as an inner wall of the collector duct.

The turbine engine may also include a water reservoir fluidly coupled with and downstream of the collector duct.

The turbine engine may also include a first evaporator module and a first condenser module. The core flowpath may extend from the core turbine section, through the first evaporator module and the first condenser module, to the flowpath duct.

The first condenser module may be radially adjacent the first evaporator module. The first condenser module may extend axially along and circumferentially about the first evaporator module.

The flowpath duct may be radially adjacent the first condenser module. The flowpath duct may extend axially along and circumferentially about the first condenser module.

The turbine engine may also include a second evaporator module and a second condenser module. A first leg of the core flowpath may extend from the core turbine section, through the first evaporator module and the first condenser module, to the flowpath duct. A second leg of the core flowpath may extend from the core turbine section, through the second evaporator module and the second condenser module, to the flowpath duct.

The flowpath duct may extend axially along and circumferentially about the first condenser module and the second condenser module.

The outer wall of the flowpath duct may be configured from or otherwise include hydrophilic material. In addition or alternatively, the first condenser module may be configured from or otherwise include hydrophobic material.

The turbine engine may also include a fan section and a bypass flowpath. The turbine engine core may be configured to power the fan section. The bypass flowpath may be fluidly coupled with and downstream of the fan section. The bypass flowpath may bypass the turbine engine core. The first evaporator module and/or the first condenser module may be disposed radially outboard of the bypass flowpath.

The turbine engine may also include a fan section and a bypass flowpath. The turbine engine core may be configured to power the fan section. The bypass flowpath may be fluidly coupled with and downstream of the fan section. The bypass flowpath may bypass the turbine engine core. The water separator may be disposed radially outboard of the bypass flowpath.

The turbine engine may also include a propulsor rotor and a power turbine section. The power turbine section may include a power turbine rotor. The power turbine section may be fluidly coupled between the core turbine section and the flowpath duct along the core flowpath. The power turbine rotor may be configured to drive rotation of the propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
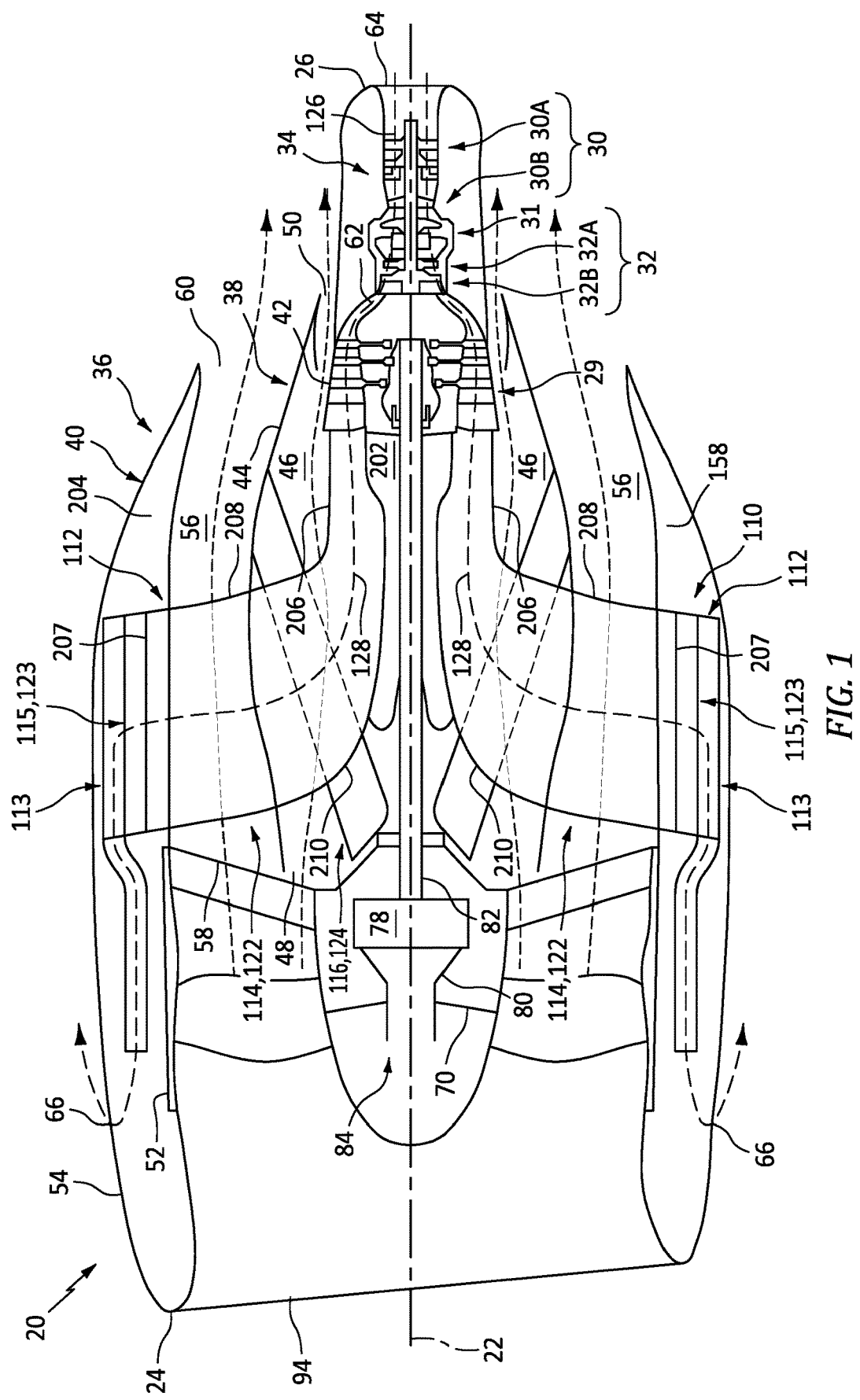
FIG. 1 is a side sectional illustration of a gas turbine engine.

FIG. 1 is a side sectional illustration of a gas turbine engine 20 for an aircraft propulsion system. This turbine engine 20 extends axially along a centerline axis 22 between a forward, upstream end 24 of the turbine engine 20 and an aft, downstream end 26 of the turbine engine 20. The turbine engine 20 includes a fan section 28, a power turbine (PT) section 29 and a turbine engine core 34; e.g., gas generator. The engine core 34 includes a core compressor section 30, a core combustor section 31 and a core turbine section 32. The core compressor section 30 of FIG. 1 includes a low pressure compressor (LPC) section 30A and a high pressure compressor (HPC) section 30B. The core turbine section 32 of FIG. 1 includes a high pressure turbine (HPT) section 32A and a low pressure turbine (LPT) section 32B.

The fan section 28, the PT section 29 and the engine core 34 may be arranged sequentially along the axis 22 within an engine housing 36. This engine housing 36 includes a housing inner structure 38 and a housing outer structure 40.

The inner structure 38 includes an inner case 42 and an inner nacelle 44. The inner case 42 houses any one or more or all of the engine sections 29-32B. The inner nacelle 44 houses and provides an aerodynamic cover over at least the inner case 42. The inner nacelle 44 of FIG. 1 also forms an outer peripheral boundary of an inner bypass flowpath 46 radially within the inner structure 38. This inner bypass flowpath 46 extends longitudinally (e.g., generally axially) within the inner structure 38 from an inlet 48 into the inner bypass flowpath 46 to an exhaust 50 out from the inner bypass flowpath 46. The inner bypass inlet 48 is fluidly coupled with and arranged downstream of the fan section 28, for example axially adjacent the fan section 28. The inner bypass exhaust 50 is arranged axially aft, downstream of the inner bypass inlet 48, for example radially outboard of and/or axially aligned with the LPT section 32B.

The outer structure 40 includes an outer case 52 and an outer nacelle 54. The outer case 52 houses at least the fan section 28. The outer nacelle 54 houses and provides an aerodynamic cover over at least the outer case 52. The outer nacelle 54 of FIG. 1 is also disposed radially outboard of, extends circumferentially about (e.g., circumscribes) and extends axially along (e.g., overlaps) at least a forward portion of the inner nacelle 44. With this arrangement, the inner structure 38 and its inner nacelle 44 and the outer structure 40 and its outer nacelle 54 form an outer bypass flowpath 56 within the engine housing 36. This outer bypass flowpath 56 is disposed radially outboard of, extends circumferentially about (e.g., circumscribes) and extends axially along (e.g., overlaps) at least a forward portion of the inner bypass flowpath 46. The outer bypass flowpath 56 extends longitudinally (e.g., generally axially) within the engine housing 36 (e.g., radially between the inner structure 38 and the outer structure 40) from an inlet 58 into the outer bypass flowpath 56 to an exhaust 60 out from the outer bypass flowpath 56. The outer bypass inlet 58 is fluidly coupled with and arranged downstream of the fan section 28, for example axially adjacent the fan section 28. The outer bypass inlet 58 is also radially outboard of and/or axially aligned with the inner bypass inlet 48. The outer bypass exhaust 60 is arranged axially aft, downstream of the outer bypass inlet 58, for example radially outboard of and/or axially aligned with (or proximate) the PT section 29. The outer bypass exhaust 60 may also be disposed axially forward of and/or radially outboard of the inner bypass exhaust 50.

A core flowpath 62 extends sequentially through the LPC section 30A, the HPC section 30B, the combustor section 31, the HPT section 32A, the LPT section 32B and the PT section 29 from an inlet 64 into the core flowpath 62 to an exhaust 66 out from the core flowpath 62. The core inlet 64 of FIG. 1 is disposed at (e.g., on, adjacent or proximate) the engine downstream end 26. This core inlet 64 is formed by the inner structure 38. The core exhaust 66 of FIG. 1 is disposed axially forward of the core inlet 64. The core exhaust 66 of FIG. 1, for example, is disposed radially outboard of the outer bypass flowpath 56, and the core exhaust 66 may be axially aligned with or forward of the fan section 28. This core exhaust 66 is formed by the outer structure 40. The core exhaust 66 may be adjacent and fluidly coupled with an environment 68 external to (e.g., outside of) the turbine engine 20. However, it is contemplated the core exhaust 66 may alternative be adjacent and fluidly coupled with the outer bypass flowpath 56.

Figure 2:
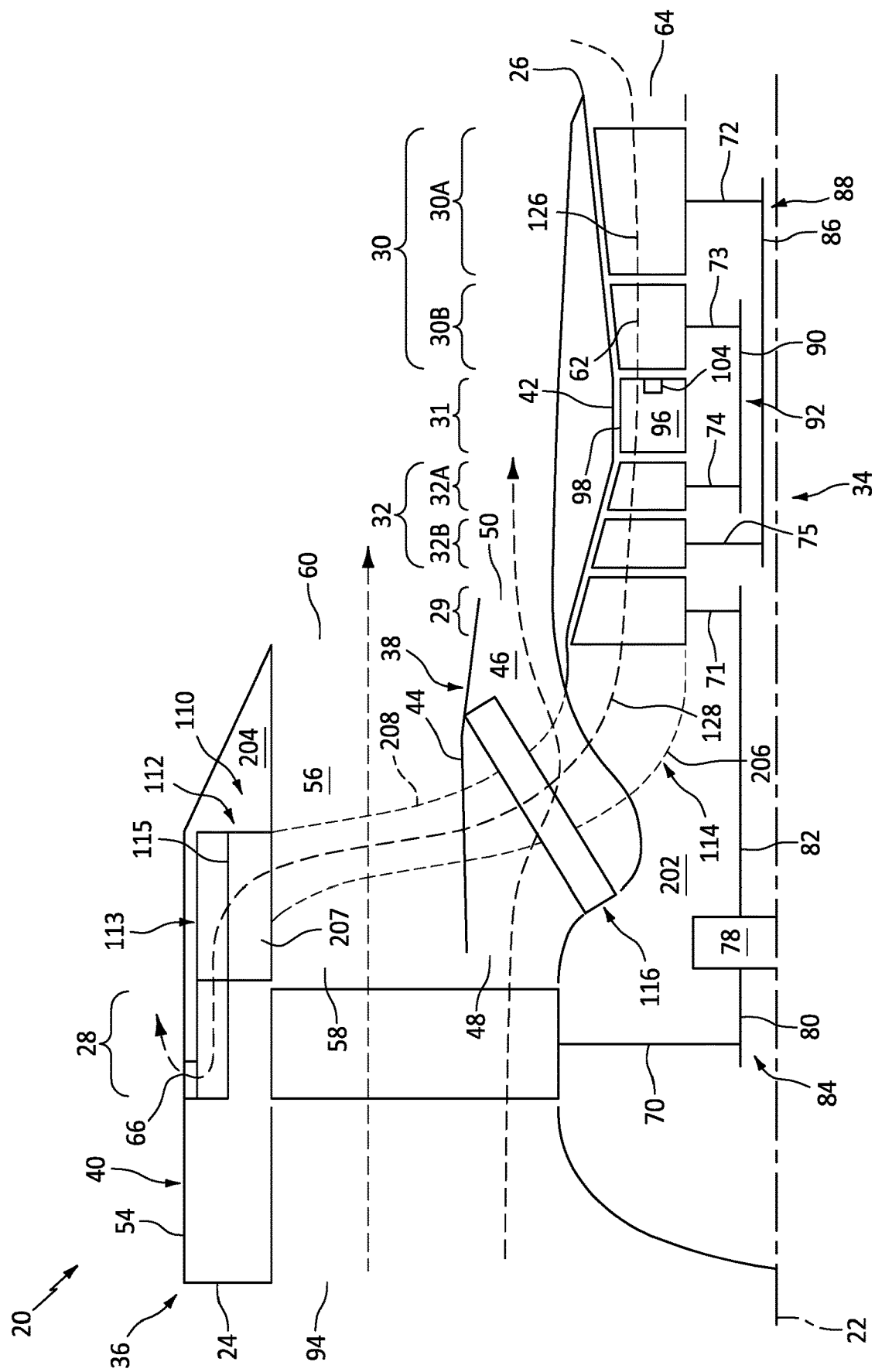
FIG. 2 is a partial schematic illustration of the turbine engine.

Referring to FIG. 2, the engine core 34 may be configured as a reverse flow engine core. The core flowpath 62 of FIG. 2, for example, extends through any one or more or all of the engine sections 30A-32B and 29 in an axially forward direction. Similarly, the turbine engine 20 is configured to move through the external environment 68 in the axially forward direction; e.g., during forward aircraft flight. By contrast, each bypass flowpath 46, 56 extends axially within the turbine engine 20 and its engine housing 36 in an axially aft direction that is opposite the axially forward direction. With such an arrangement, the engine sections 30A-32B, 29 and 28 may be arranged sequentially along the axis 22 between the engine downstream end 26 and the engine upstream end 24.

Each of the engine sections 28, 29, 30A, 30B, 32A and 32B of FIG. 2 includes a respective bladed rotor 70-75. Each of these bladed rotors 70-75 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 70 is connected to a geartrain 78 through a fan shaft 80. The geartrain 78 is connected to the PT rotor 71 through a power turbine (PT) shaft 82. At least (or only) the fan rotor 70, the fan shaft 80, the geartrain 78, the PT shaft 82 and the PT rotor 71 collectively form a fan rotating structure 84. This fan rotating structure 84 of FIG. 2 is configured as a geared rotating structure where, for example, the PT rotor 71 rotates at a different (e.g., faster) speed than the fan rotor 70. However, it is contemplated the fan rotating structure 84 may alternatively be a direct drive rotating structure where, for example, the fan shaft 80 and the geartrain 78 are omitted and the PT shaft 82 directly connects the fan rotor 70 and the PT rotor 71 together. Referring again to FIG. 2, the LPC rotor 72 is connected to the LPT rotor 75 through a low speed shaft 86. At least (or only) the LPC rotor 72, the low speed shaft 86 and the LPT rotor 75 collectively form a low speed rotating structure 88 of the engine core 34. The HPC rotor 73 is connected to the HPT rotor 74 through a high speed shaft 90. At least (or only) the HPC rotor 73, the high speed shaft 90 and the HPT rotor 74 collectively form a high speed rotating structure 92 of the engine core 34. Each of the engine rotating structures 84, 88, 92 may be rotatable about the axis 22; e.g., a rotational axis. These engine rotating structures 84, 88, 92 may be rotatably connected to and supported by the engine housing 36 and its inner structure 38 through a plurality of bearings.

During operation, air enters the turbine engine 20 and its engine core 34 at the engine downstream end 26 through the core inlet 64. This air directed into the core flowpath 62 may be referred to as "core air". Air also enters the turbine engine 20 at the engine upstream end 24 through a forward engine inlet 94. This air is directed through the fan section 28 and into the inner bypass flowpath 46 and into the outer bypass flowpath 56; e.g., in parallel. The air within the outer bypass flowpath 56 may be referred to as "bypass air". The air within the inner bypass flowpath 46 may be referred to as "cooling air".

The core air is compressed by the LPC rotor 72 and the HPC rotor 73 and directed into a combustion chamber 96 of a combustor 98 (e.g., an annular combustor) in the combustor section 31. Fuel is injected into the combustion chamber 96 and mixed with the compressed core air to provide a fuel-air mixture. This fuel-air mixture is ignited and combustion products thereof flow through and sequentially cause the HPT rotor 74, the LPT rotor 75 and the PT rotor 71 to rotate. The rotation of the HPT rotor 74 and the LPT rotor 75 respectively drive rotation of the HPC rotor 73 and the LPC rotor 72 and, thus, compression of the air received from the core inlet 64. The rotation of the PT rotor 71 (e.g., independently) drives rotation of the fan rotor 70. The rotation of the fan rotor 70 propels the bypass air through and out of the outer bypass flowpath 56 and propels the cooling air through and out of the inner bypass flowpath 46. The propulsion of the bypass air may account for a majority of thrust generated by the turbine engine 20.

Figure 3:
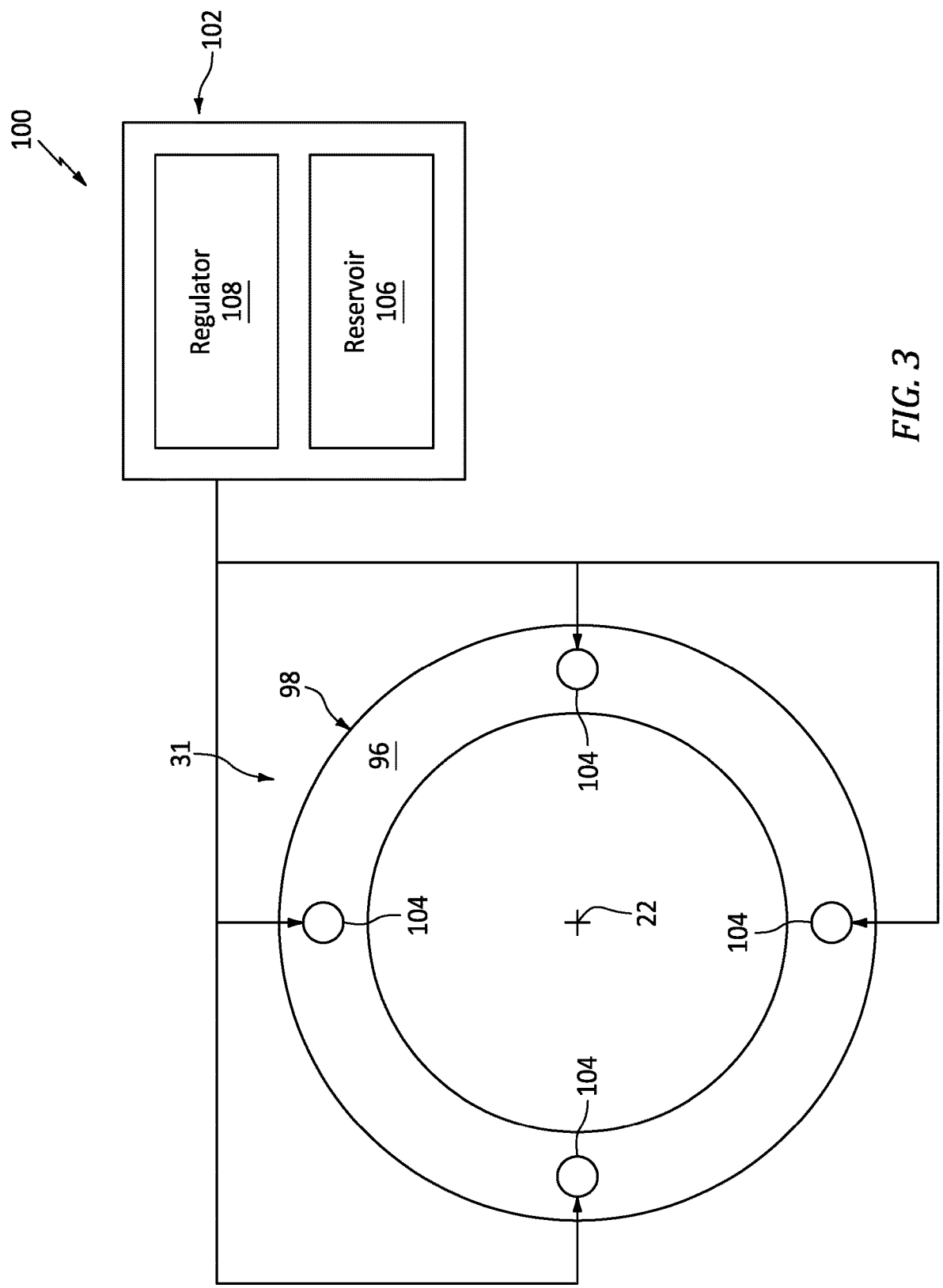
FIG. 3 is a schematic illustration of a fuel system for the turbine engine.

Referring to FIG. 3, the turbine engine 20 includes a fuel system 100 for delivering the fuel to the combustor 98. This fuel system 100 includes a fuel source 102 and one or more fuel injectors 104; see also FIG. 2. The fuel source 102 of FIG. 3 includes a fuel reservoir 106 and/or a fuel flow regulator 108; e.g., a valve. The fuel reservoir 106 is configured to store the fuel before, during and/or after turbine engine operation. The fuel reservoir 106, for example, may be configured as or otherwise include a tank, a cylinder, a pressure vessel, a bladder or any other type of fuel storage container. The fuel flow regulator 108 is configured to direct and/or meter a flow of the fuel from the fuel reservoir 106 to the fuel injectors 104. The fuel injectors 104 may be arranged circumferentially about the axis 22 in an array. Each fuel injector 104 is configured to direct the fuel received from the fuel source 102 into the combustion chamber 96 for mixing with the compressed core air to provide the fuel-air mixture.

The turbine engine 20 of FIGS. 1 and 2 may be configured as a non-hydrocarbon turbine engine/a hydrocarbon free turbine engine. The turbine engine 20, for example, may be configured as a hydrogen fueled turbine engine. The fuel injected into the combustion chamber 96 by the fuel injectors 104 (see FIGS. 2 and 3), for example, may be hydrogen ($H_2$) fuel; e.g., $H_2$ gas. The present disclosure, however, is not limited to hydrogen fueled turbine engines nor to non-hydrocarbon turbine engines. The turbine engine 20, for example, may also or alternatively be fueled by another non-hydrocarbon fuel such as, but not limited to, ammonia ($NH_3$). The turbine engine 20 may still also or alternatively be fueled using any other fuel, including hydrocarbon fuels (e.g., kerosene, jet fuel, sustainable aviation fuel (SAF), etc.), which produces combustion products that include water ($H_2O$) vapor.

Figure 4:
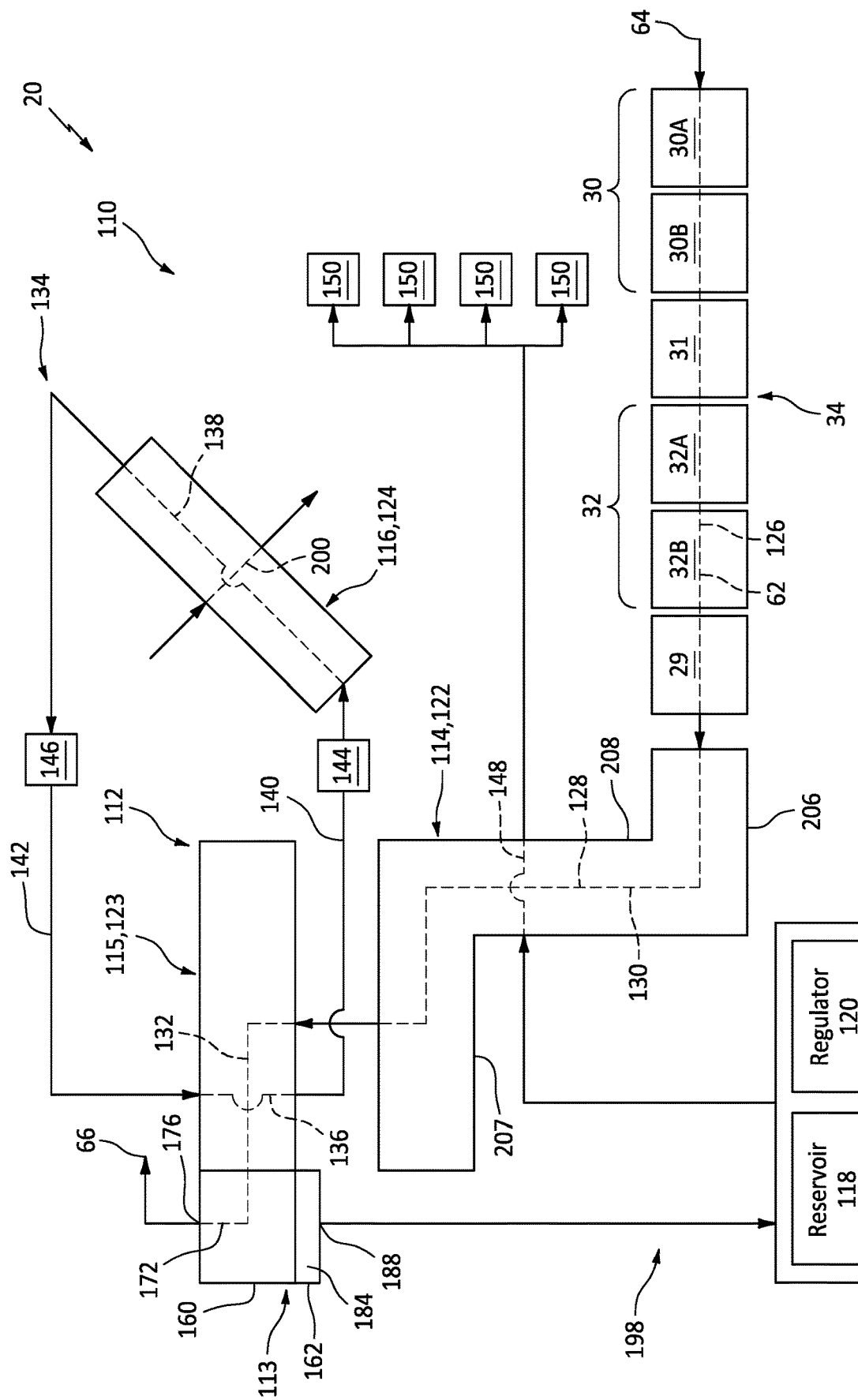
FIG. 4 is a schematic illustration of a water and heat energy recovery system arranged with other components of the turbine engine.

Referring to FIG. 4, the turbine engine 20 may also include a water and heat energy recovery system 110. This recovery system 110 is configured to recover at least some of the water vapor produced by the combustion of the fuel-air mixture within the combustion chamber 96 (see FIG. 2). The recovery system 110 is also configured to evaporate the recovered water using heat energy recuperated from the combustion products to provide steam for use in the engine core 34; e.g., in the combustor section 31. The recovery system 110 of FIG. 4, for example, includes one or more heat exchange (HX) systems 112 (one shown in FIG. 4 for ease of illustration) and at least (or only) one passive water separator 113; e.g., a water collector.

Figure 5:
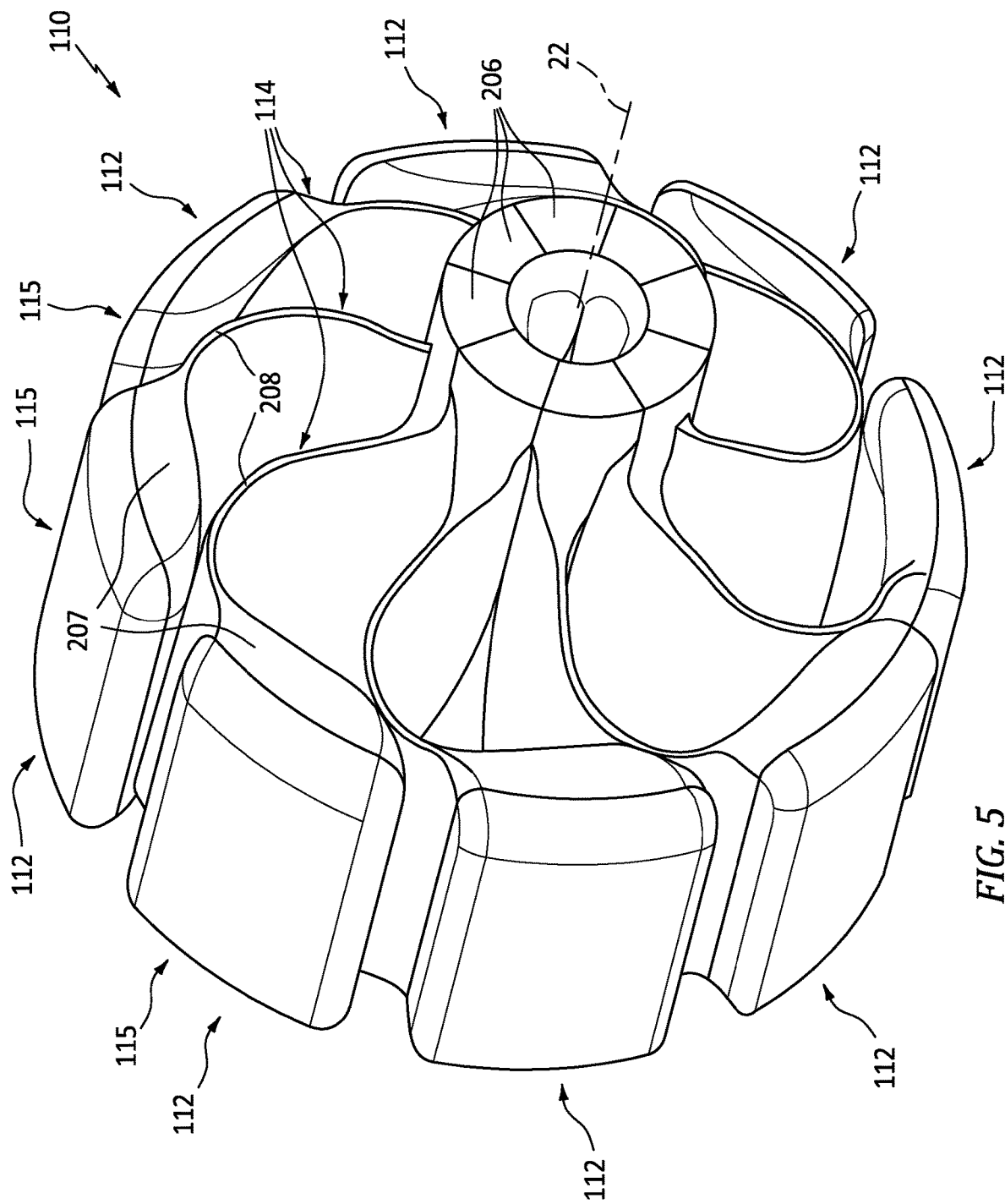
FIG. 5 is a perspective illustration of an evaporator array arranged with a condenser array.

Referring to FIG. 5, the HX systems 112 are distributed circumferentially about the axis 22 in an array; e.g., a circular array. Referring again to FIG. 4, each HX system 112 includes a (e.g., arcuate) water evaporator module 114 and a (e.g., arcuate) water condenser module 115. The recovery system 110 of FIG. 4 also includes a (e.g., annular or arcuate) refrigerant condenser module 116, a water reservoir 118 and/or a system flow regulator 120; e.g., a pump and/or a valve.

The water evaporator module 114 includes a water evaporator 122. The water condenser module 115 includes a water condenser 123. The refrigerant condenser module 116 includes a refrigerant condenser 124. Each heat exchanger 122, 123, 124 may form an entirety of the respective heat exchanger module 114, 115, 116. Alternatively, one or more or all of the heat exchangers 122-124 may each form a select section of the respective heat exchanger module 114-116, or that heat exchanger 122, 123, 124 may be divided into a plurality of heat exchange units which form a plurality of discrete sections of the heat exchanger module 114, 115, 116. Where the heat exchanger 122, 123, 124 forms one or more sections of the respective heat exchanger module 114, 115, 116, one or more other sections of the respective heat exchange module 114, 115, 116 may be formed by duct(s).

The water evaporator module 114 and the water condenser module 115 are fluidly coupled inline with the core flowpath 62. For example, the core flowpath 62 of FIG. 1 includes a (e.g., annular) base leg 126 and a plurality of (e.g., non-annular, parallel) heat exchange (HX) legs 128. The base leg 126 of FIG. 4 extends sequentially through the LPC section 30A, the HPC section 30B, the combustor section 31, the HPT section 32A, the LPT section 32B and the PT section 29 from the core inlet 64 to an intersection with the HX legs 128 at a downstream end of the PT section 29. Each HX leg 128 is associated with a respective HX system 112 (see also FIG. 1). Each HX leg 128 of FIG. 4 branches off (e.g., in parallel) from the base leg 126 at the intersection and extends from the PT section 29, sequentially through a gas (e.g., combustion products) flowpath 130 of the water evaporator module 114 and its water evaporator 122 and a gas (e.g., combustion products) flowpath 132 of the water condenser module 115 and its water condenser 123, to the core exhaust 66. Briefly, the core exhaust 66 may be formed by a common outlet for all of the HX legs 128. Alternatively, the core exhaust 66 may be formed by a plurality of discrete outlets, where each outlet may be fluidly coupled with a respective single one of the HX legs 128 (or a respective sub-set of the HX legs 128).

Each water condenser module 115 and the refrigerant condenser module 116 are configured together in a refrigerant flow circuit 134. For example, a working fluid (e.g., refrigerant) flowpath 136 of each water condenser module 115 and its water condenser 123 and a working fluid (e.g., refrigerant) flowpath 138 of the refrigerant condenser module 116 and its refrigerant condenser 124 are fluidly coupled in a loop by a respective working fluid first passage 140 and a respective working fluid second passage 142. The first passage 140 may direct a working fluid (e.g., refrigerant or another coolant) from the respective water condenser module 115 and its fluid flowpath 136 to the refrigerant condenser module 116 and its fluid flowpath 138. The second passage 142 may direct the working fluid from the refrigerant condenser module 116 and its fluid flowpath 138 to the respective water condenser module 115 and its fluid flowpath 136. This refrigerant flow circuit 134 may also include a refrigerant flow regulator 144, 146 (e.g., a compressor, a pump and/or a valve) arranged inline with one or both of the working fluid passages 140, 142 to regulate circulation of the working fluid through each water condenser module 115 and the refrigerant condenser module 116.

The water reservoir 118 is configured to hold water before, during and/or after turbine engine operation. The water reservoir 118, for example, may be configured as or otherwise include a tank, a cylinder, a pressure vessel, a bladder or any other type of water storage container. The water reservoir 118 of FIG. 4 is fluidly coupled with and between the respective water condenser gas flowpath 132 (via the water separator 113) and a water flowpath 148 of the respective water evaporator module 114 and its water evaporator 122. The system flow regulator 120 is arranged with the water reservoir 118, and configured to direct and/or meter a flow of the water from the water reservoir 118 to one or more other components 150 of the turbine engine 20. One or more of the turbine engine components 150 may each be configured as or otherwise include a steam injector. Each steam injector may be configured to inject the steam into the combustion chamber 96 (see FIG. 2). One or more of the turbine engine components 150 may also or alternatively be configured as an outlet for introducing the steam for cooling the combustor 98; e.g., a combustor wall, etc. The present disclosure, however, is not limited to the foregoing exemplary turbine engine components 150 which utilize the steam. In particular, various other uses for steam in a turbine engine are known in the art, and the present disclosure is not limited to any particular one thereof.

Figure 6:
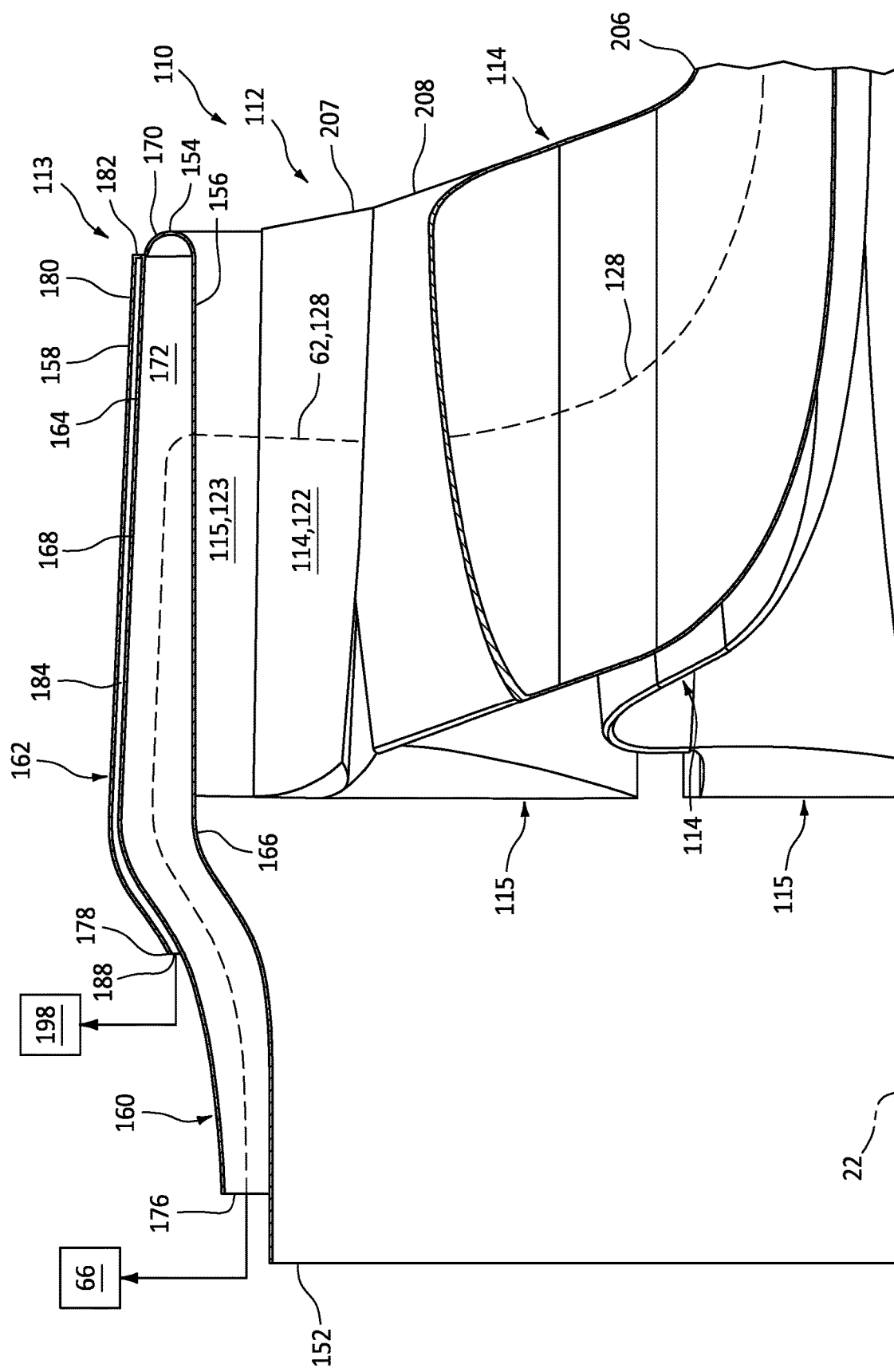
FIGS. 6-8 are perspective cutaway illustrations of various portions of the recovery system with a water separator.

Referring to FIG. 6, the water separator 113 extends axially along axis 22 from a first end 152 (e.g., a forward end) of the water separator 113 to a second end 154 (e.g., an aft end) of the water separator 113. The water separator 113 extends radially from a radial inner side 156 of the water separator 113 to a radial outer side 158 of the water separator 113. The water separator 113 extends circumferentially about (e.g., completely or partially around) the axis 22. The water separator 113, for example, may have a full-hoop (e.g., annular) geometry. In another example, the water separator 113 may have an arcuate (e.g., partial circular) geometry. With such an arrangement, the recovery system 110 may (or may not) include multiple of the water separators 113 arranged (e.g., end-to-end) circumferentially about the axis 22 in an array; e.g., a circular array. However, for ease of description, the water separator 113 may be described herein with the full-hoop geometry. The water separator 113 of FIG. 6 includes a flowpath duct 160 and a collector duct 162.

The flowpath duct 160 extends axially along the axis 22 from the separator first end 152 to the separator second end 154. The flowpath duct 160 extends radially from the separator inner side 156 to a radial outer side 164 of the flowpath duct 160. The flowpath duct 160 extends circumferentially about (e.g., completely or partially around) the axis 22. The flowpath duct 160, for example, may have a full-hoop (e.g., annular) geometry where the water separator 113 has its full-hoop geometry. In another example, the flowpath duct 160 may have an arcuate (e.g., partial circular) geometry where the water separator 113 has its arcuate geometry.

The flowpath duct 160 of FIG. 6 includes an inner wall 166, an outer wall 168 and an endwall 170. The flowpath duct inner wall 166 is disposed at the separator inner side 156. The flowpath duct outer wall 168 is disposed at the flowpath duct outer side 164. The flowpath duct endwall 170 is disposed at the separator second end 154, and extends radially between and is connected to the flowpath duct inner wall 166 and the flowpath duct outer wall 168. With this arrangement, the flowpath duct walls 166, 168 and 170 form an internal flowpath duct volume 172 (e.g., a passage, a cavity, etc.) within the flowpath duct 160.

Figure 7:
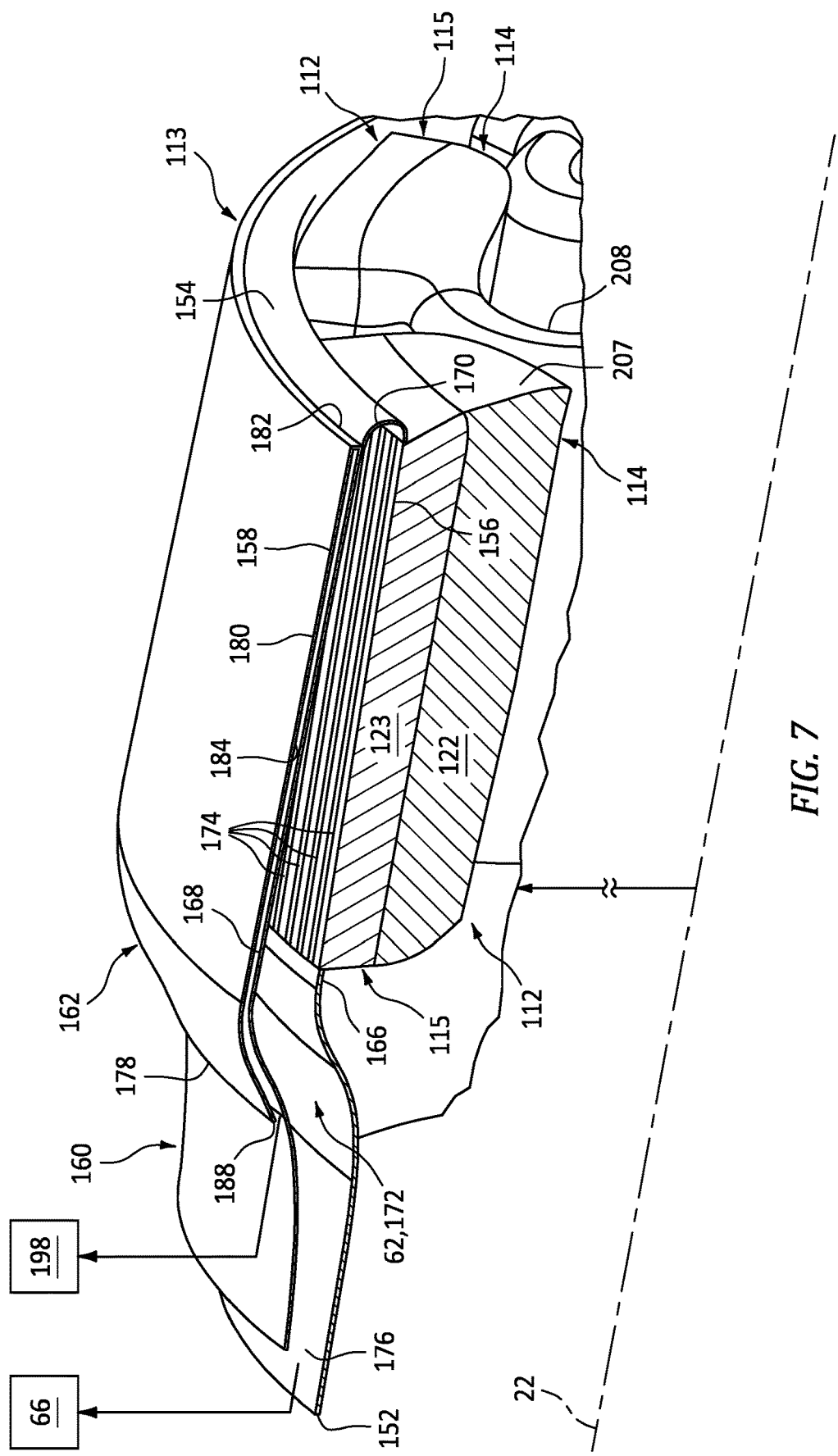

Referring to FIG. 7, the flowpath duct volume 172 is fluidly coupled with and extends between one or more flowpath duct inlets 174 into the flowpath duct volume 172 and a flowpath duct outlet 176 (e.g., an exhaust) from the flowpath duct volume 172. The flowpath duct inlets 174 may be arranged (e.g., spaced) circumferentially about the axis 22 in flowpath duct inner wall 166. Each of the flowpath duct inlets 174 of FIG. 7 is configured as a (e.g., axially extending) slot which projects radially through the flowpath duct inner wall 166. One or more of the flowpath duct inlets 174, however, may alternatively be configured as another type of perforation through the flowpath duct inner wall 166; e.g., a circular or oval through-hole, a port, etc. The flowpath duct outlet 176 is disposed at (or about) the separator first end 152. The flowpath duct outlet 176 of FIG. 7 is configured as (e.g., annular or arcuate) opening formed radially between and by the flowpath duct inner wall 166 and the flowpath duct outer wall 168.

The flowpath duct 160 and, more generally, the water separator 113 are disposed radially outboard of the HX systems 112 and their water condenser modules 115. The flowpath duct 160 of FIG. 7, for example, is disposed radially adjacent a radial outer side of each water condenser module 115. This flowpath duct 160 extends axially along and circumferentially about (e.g., circumscribes) the array of the HX systems 112 and their water condenser modules 115. The flowpath duct 160 of FIG. 7 thereby axially and circumferentially overlaps each water condenser module 115. Moreover, the flowpath duct inlets 174 may be arranged into multiple sets, where each set of one or more of the flowpath duct inlets 174 also axially and circumferentially overlaps each water condenser module 115 and its respective water condenser 123. The flowpath duct inlets 174 thereby fluidly couple a passage (or passages) through each water condenser module 115 and its respective water condenser 123 to the flowpath duct volume 172. The flowpath duct outlet 176 is between and fluidly couples the flowpath duct volume 172 and the core exhaust 66. With this arrangement, the flowpath duct volume 172 forms a respective longitudinal portion of the core flowpath 62 through the water separator 113 and its flowpath duct 160.

The collector duct 162 extends axially along the axis 22 and the flowpath duct 160 from a first end 178 (e.g., a forward end) of the collector duct 162 to (or about) the separator second end 154. The collector duct 162 extends radially out (in a radial outward direction away from the axis 22) from the flowpath duct 160 and to the separator outer side 158. The collector duct 162 extends circumferentially about (e.g., completely or partially around) the axis 22 and the flowpath duct 160. The collector duct 162, for example, may have a full-hoop (e.g., annular) geometry where the water separator 113 has its full-hoop geometry. In another example, the collector duct 162 may have an arcuate (e.g., partial circular) geometry where the water separator 113 has its arcuate geometry.

The collector duct 162 of FIG. 7 may share a common wall (e.g., divider wall) with the flowpath duct 160. At least a portion of the flowpath duct outer wall 168, for example, may also be configured as an inner wall of the collector duct 162/an intermediate wall of the water separator 113. The collector duct 162 of FIG. 7 also includes an outer wall 180 and an endwall 182. The collector duct outer wall 180 is disposed at the separator outer side 158. The collector duct endwall 182 is disposed at (or about) the separator second end 154, and extends radially between and is connected to the flowpath duct outer wall 168 (here, the collector duct inner wall) and the collector duct outer wall 180. With this arrangement, the collector duct walls 168, 180 and 182 form an internal collector duct volume 184 (e.g., a passage, a cavity, etc.) within the collector duct 162. Note, the water separator 113 is configured such that this collector duct volume 184 may have a lower pressure than the flowpath duct volume 172 during normal engine operation.

Figure 8:
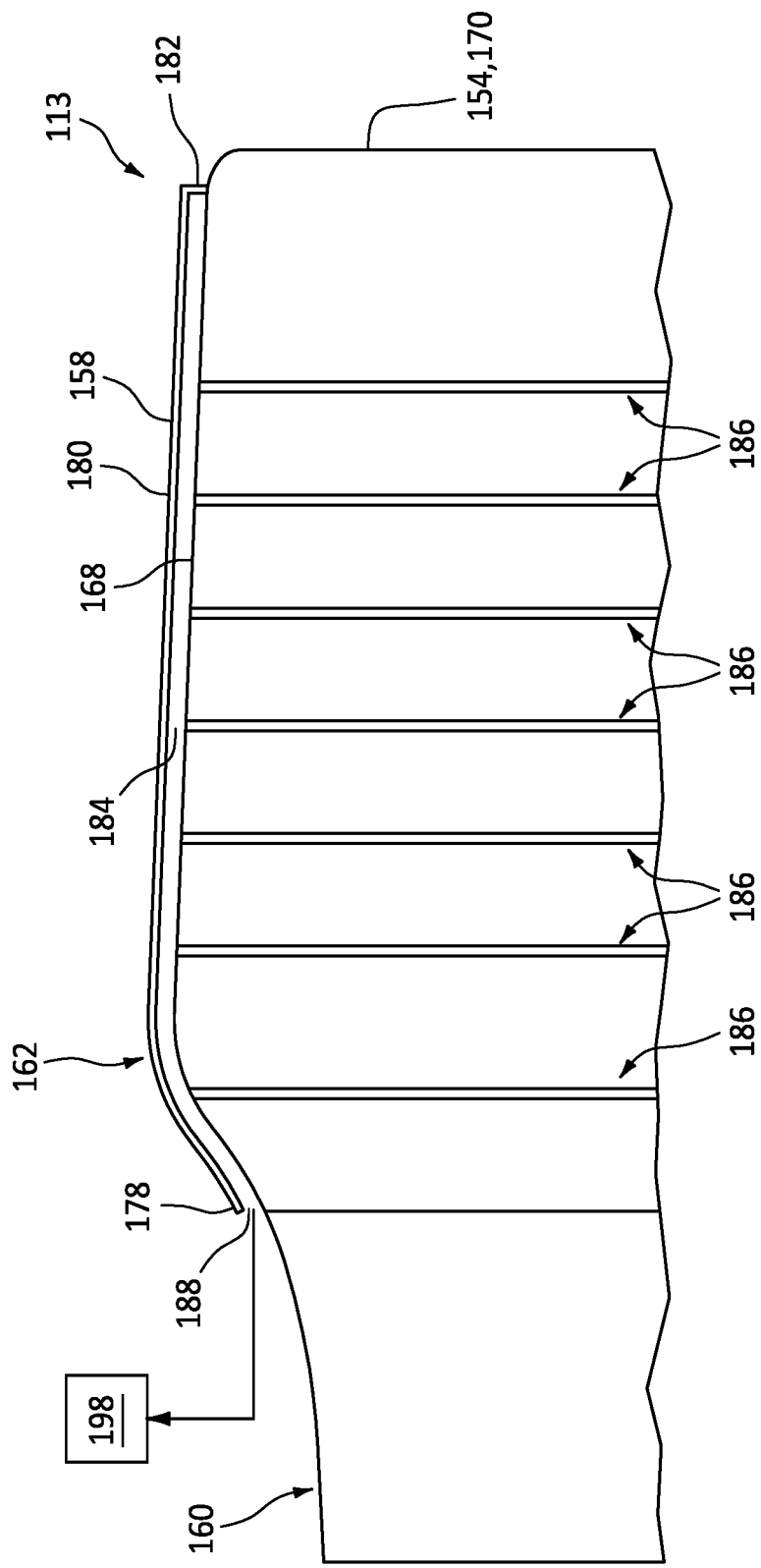

Referring to FIG. 8, the collector duct volume 184 is fluidly coupled with and extends between one or more (e.g., discrete) water permeable regions 186 in the flowpath duct outer wall 168 and a collector duct outlet 188 from the collector duct volume 184. The water permeable regions 186 may be arranged (e.g., spaced) axially along the axis 22 and the flowpath duct outer wall 168. Each of the water permeable regions 186 may extend circumferentially about the axis 22 and along the flowpath duct outer wall 168. Each water permeable region 186, for example, may be configured with a full-hoop (e.g., annular) geometry. In another example, each water permeable region 186 may be configured with an arcuate (e.g., partial circular) geometry. With such an arrangement, the water separator 113 may (or may not) include multiple of the water permeable regions 186 arranged circumferentially (e.g., end-to-end) about the axis 22 in an array; e.g., a circular array. However, for ease of description, each water permeable region 186 may be described herein with the full-hoop geometry.

Figure 9A:
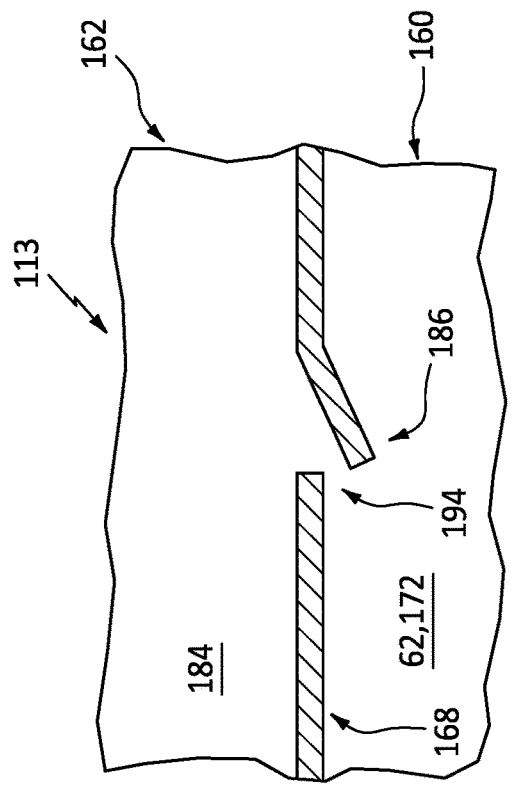
FIGS. 9A-C are partial sectional illustrations of the water separator with various water permeable region arrangements.
Figure 9B:
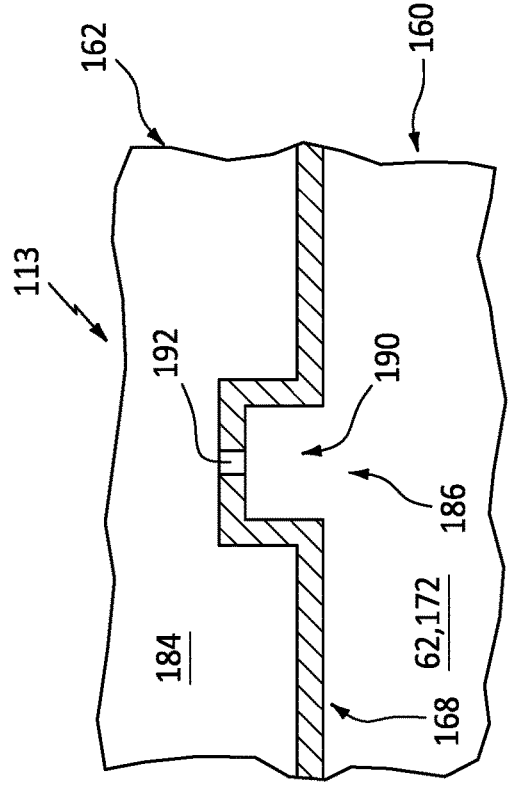
Figure 9C:
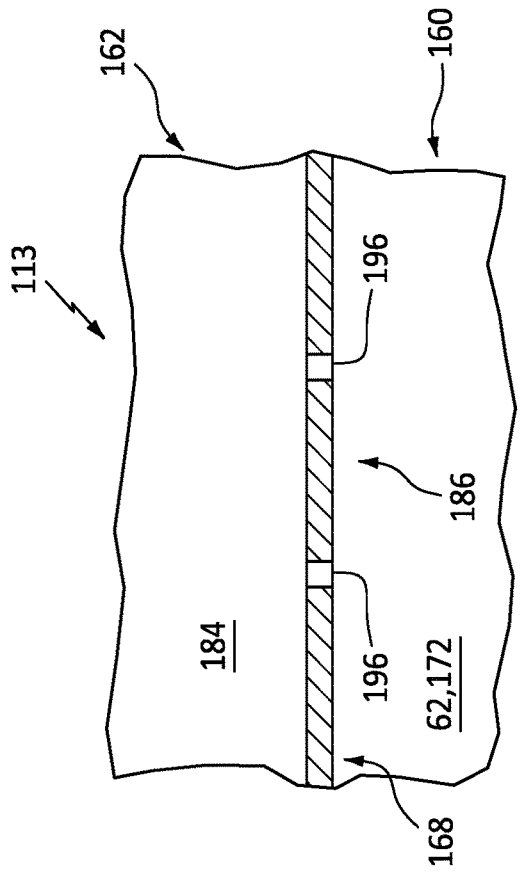

Referring to FIGS. 9A-C, each water permeable region 186 is configured to direct water radially across the flowpath duct outer wall 168 from the flowpath duct volume 172 into the collector duct volume 184. For example, referring to FIG. 9A, one or more of the water permeable regions 186 may each be configured as or otherwise include a gutter. The water permeable region 186 of FIG. 9, for example, includes a gutter channel 190 and a gutter drain 192 (or multiple drains). The gutter channel 190 projects radially (e.g., in the radial outward direction) from the flowpath duct volume 172 into the flowpath duct outer wall 168. The gutter channel 190 extends axially within the flowpath duct outer wall 168. The gutter channel 190 extends circumferentially about (e.g., completely or partially around) the axis 22 within the flowpath duct outer wall 168. The gutter drain 192 fluidly couples the gutter channel 190 to the collector duct volume 184. The gutter drain 192 of FIG. 9A, for example, projects radially out from a distal end of the gutter channel 190, through the flowpath duct outer wall 168, to the collector duct volume 184. In another example, referring to FIG. 9B, one or more of the water permeable regions 186 may each be configured as or otherwise include a scoop 194. In still another example, referring to FIG. 9C, one or more of the water permeable regions 186 may each be configured as or otherwise include a plurality of perforations 196; e.g., an axial and/or circumferentially extending array of perforations.

Referring to FIG. 8, the collector duct outlet 188 is disposed at the collector duct first end 178. The collector duct outlet 188 of FIG. 8 is configured as (e.g., annular or arcuate) opening formed radially between and by the flowpath duct outer wall 168 and the collector duct outer wall 180. The collector duct outlet 188 is between and fluidly couples the collector duct volume 184 to a water circuit 198 of the recovery system 110 (see also FIG. 4). With this arrangement, referring to FIG. 4, the collector duct volume 184 may fluidly couple the flowpath duct volume 172 and, thus, the core flowpath 62 to water circuit 198 and its water reservoir 118.

During operation of the recovery system 110 of FIG. 4, relatively cool cooling air is directed into an air flowpath 200 of the refrigerant condenser module 116 and its refrigerant condenser 124. The working fluid is directed into the refrigerant condenser fluid flowpath 138. The refrigerant condenser module 116 and its refrigerant condenser 124 exchange heat energy between the cooling air flowing within the refrigerant condenser air flowpath 200 and the working fluid flowing within the refrigerant condenser fluid flowpath 138. The working fluid flowing within the refrigerant condenser fluid flowpath 138 is typically warmer than the cooling air flowing within the refrigerant condenser air flowpath 200. The refrigerant condenser module 116 and its refrigerant condenser 124 are thereby operable to cool the working fluid using the cooling air. This cooling air is received through the inner bypass flowpath 46 (see FIGS. 1 and 2).

For each HX system 112, the cooled working fluid is directed into the water condenser fluid flowpath 136. The relatively hot combustion products, including the water vapor, are directed into the water condenser gas flowpath 132. The water condenser module 115 and its water condenser 123 exchange heat energy between the working fluid flowing within the water condenser fluid flowpath 136 and the combustion products flowing within the water condenser gas flowpath 132. The combustion products flowing within the water condenser gas flowpath 132 are typically warmer than the working fluid flowing within the water condenser fluid flowpath 136. The water condenser module 115 and its water condenser 123 are thereby operable to cool the combustion products using the working fluid. This cooling of the combustion products may condense at least some of the water vapor (e.g., the gaseous water) flowing within the water condenser gas flowpath 132 into liquid water droplets.

The liquid water droplets and the other remaining combustion products are directed (in the radial outward direction) out of each water condenser gas flowpath 132 into the flowpath duct volume 172. Referring to FIG. 7, the relatively heavy liquid water droplets may impinge against the flowpath duct outer wall 168, whereas the relatively light weight remaining combustion products (e.g., gas) may turn and pass through the flowpath duct volume 172 to the core exhaust 60. The flow of the remaining combustion products into and through the flowpath duct volume 172 may push the liquid water droplets radially against and along the flowpath duct outer wall 168 to a respective water permeable region 186 (see FIGS. 8-9C). Referring to FIGS. 9A-C, the water droplets may then pass through the respective water permeable region 186 into the collector duct volume 184. The water separator 113 may thereby separate (e.g., passively separate without, for example, use of a driven element such as an impeller) the liquid water droplets from the other remaining combustion products while directing the remaining combustion products towards the core exhaust 66 and while directing the collected water to the water circuit 198.

Referring to FIG. 4, the water directed into the water circuit 198 may then be directed to the water reservoir 118 for (e.g., temporary) storage.

The system flow regulator 120 directs some of the water from the water reservoir 118 into and through the water evaporator water flowpath 148. The relatively hot combustion products are further directed through the water evaporator gas flowpath 130, for example, prior to flowing through the water condenser gas flowpath 132. The water evaporator module 114 and its water evaporator 122 exchange heat energy between the water flowing within the water evaporator water flowpath 148 and the combustion products flowing within the water evaporator gas flowpath 130. The combustion products flowing within the water evaporator gas flowpath 130 are typically warmer than the liquid water flowing within the water evaporator water flowpath 148. The water evaporator module 114 and its water evaporator 122 are thereby operable to heat the water using the combustion products and thereby recuperate the heat energy from the combustion products. This heating of the water may evaporate at least some or all of the liquid water flowing within the water evaporator water flowpath 148 into gaseous water—steam. At least some of this steam is directed to the turbine engine components 150 for use in the engine core 34; e.g., use in the combustor section 31.

Referring to FIGS. 1 and 2, each water evaporator module 114 may be configured to extend radially across the inner bypass flowpath 46 and the outer bypass flowpath 56 from an inner cavity 202 (e.g., an annular volume, an arcuate volume, compartment, chamber, etc.) of the inner structure 38 to an outer cavity 204 (e.g., an annular volume, an arcuate volume, compartment, chamber, etc.) of the outer structure 40. Each water evaporator module 114 of FIGS. 1 and 2, for example, includes an inner section 206, an outer section 207 and an intermediate section 208.

The inner section 206 is disposed within the inner cavity 202. This inner section 206 projects axially out (or otherwise away) from a forward, downstream end of the PT section 29 along the axis 22. The inner section 206 may extend circumferentially about the axis 22 between, for example, twenty degrees (20°) and ninety degrees (90°); e.g., between thirty-five degrees (35°) and forty-five degrees (45°). With this arrangement, each water evaporator module 114 and its inner section 206 extend circumferentially about and/or axially along the PT shaft 82. The present disclosure, however, is not limited to such an exemplary range and may be adjusted based on, for example, the number of HX systems 112 arranged about the axis 22. Each bypass flowpath 46, 56 is disposed radially outboard of, extends circumferentially about (e.g., circumscribes) and/or extends axially along (e.g., overlaps) each water evaporator module 114 and its inner section 206. Here, the inner section 206 is housed within the inner structure 38 and its inner nacelle 44.

The outer section 207 may be disposed completely or partially within the outer cavity 204. The outer section 207 of FIG. 1, for example, projects radially into the outer cavity 204 to the respective water condenser module 115 of the same HX system 112. This outer section 207 extends axially along the axis 22 between opposing axial ends of the outer section 207. The outer section 207 extends circumferentially about the axis 22 between, for example, twenty degrees (20°) and ninety degrees (90°); e.g., between thirty-five degrees (35°) and forty-five degrees (45°). With this arrangement, each water evaporator module 114 and its outer section 207 extend circumferentially about (and/or within) and/or axially along the outer bypass flowpath 56. The present disclosure, however, is not limited to such an exemplary range and may be adjusted based on, for example, the number of HX systems 112 arranged about the axis 22.

The intermediate section 208 is fluidly coupled with and between the inner section 206 and the outer section 207. The intermediate section 208, for example, extends radially between and to the inner section 206 and the outer section 207. With this arrangement, each water evaporator module 114 and its intermediate section 208 extend radially across (or at least partially within) the inner bypass flowpath 46 and/or the outer bypass flowpath 56. The intermediate section 208 may also project radially through a port 210 (e.g., an opening, a window, etc.) of the refrigerant condenser module 116 in order to cross the refrigerant condenser module 116.

Referring to FIGS. 1 and 2, each water condenser module 115 may be configured radially outboard of the water evaporator module 114 and its outer section 207 from the same HX system 112. Each water condenser module 115, for example, may be disposed in the outer cavity 204 above the respective water evaporator module 114 and its outer section 207. Each water condenser module 115 projects radially out from a radial outer side of the respective outer section 207. Each water condenser module 115 extends axially along the axis 22 between opposing axial ends of the respective water condenser module 115. Each water condenser module 115 extends circumferentially about the axis 22 between, for example, twenty degrees) (20°) and ninety degrees (90°); e.g., between thirty-five degrees (35°) and forty-five degrees) (45°). With this arrangement, each water condenser module 115 extends circumferentially about and/or axially along the outer bypass flowpath 56 and/or the respective outer section 207 of the water evaporator module 114. The present disclosure, however, is not limited to such an exemplary range and may be adjusted based on, for example, the number of HX systems 112 arranged about the axis 22. Here, each water condenser module 115 is housed within the outer structure 40.

The core flowpath 62 of FIG. 1 and each of its HX legs 128 extends axially along the axis 22 in a forward direction out of the PT section 29 and into a respective water evaporator module 114 and its inner section 206. The core flowpath 62 and each of its HX legs 128 extends radially through the intermediate section 208 from the inner section 206 to the outer section 207. The core flowpath 62 and each of its HX legs 128 extends radially out (e.g., in the radial outward direction) from the respective water evaporator module 114 and its outer section 207 and into a respective water condenser module 115. The core flowpath 62 and each of its HX legs 128 extends radially out (e.g., in the radial outward direction) from the respective water condenser module 115 into the water separator 113, where the core flowpath 62 then extends through the water separator 113 to the core exhaust 66.

In some embodiments, referring to FIG. 6, one or more internal members of each water condenser module 115 and its respective water condenser 123 may be formed from or coated with a hydrophobic material. The flowpath duct outer wall 168 may also or alternatively be formed from or coated with a hydrophilic material. These material(s) may aid in the water separation process by guiding the condensed water droplets towards the water permeable regions 186.

In some embodiments, referring to FIG. 4, the refrigerant condenser 124 may be a discrete component from the water condenser 123. However, it is contemplated the refrigerant condenser 124 may alternatively be omitted. In such embodiments, the water condenser 123 may extend into the bypass flowpath 56 (see FIG. 1) and be operable to transfer heat energy between the bypass air and the combustion products for condensing the water vapor out of the combustion products. In addition or alternatively, some of the bypass air may be bled or otherwise directed (e.g., via ram air) from the bypass flowpath 56 (or another area) and directed into/through the water condenser 123.

In some embodiments, the engine core 34 may be arranged coaxial with the fan rotor 70 and the geartrain 78. The present disclosure, however, is not limited to such an exemplary arrangement. For example, a centerline of the engine core 34 may alternatively be angularly offset from and/or (e.g., radially) displaced from a centerline of the fan rotor 70 and/or a centerline of the geartrain 78.

The turbine engine 20 is generally described above as a turbofan turbine engine. The present disclosure, however, is not limited to such an exemplary turbofan turbine engine configuration. The fan rotor 70, for example, may be configured as another type of ducted or un-ducted (e.g., open) propulsor rotor for generating propulsive thrust. Furthermore, the recovery system 110 may be included in a turbine engine configured with a single spool, with a dual spool (e.g., see FIG. 2), or with a more than two spool engine core. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A turbine engine, comprising:
   a turbine engine core including a core compressor section, a core combustor section and a core turbine section;
   a water separator including a flowpath duct and a collector duct, the flowpath duct extending axially along and circumferentially about an axis, the collector duct extending axially along and circumferentially about the flowpath duct, and the collector duct fluidly coupled with the flowpath duct through a water permeable region in an outer wall of the flowpath duct; and
   a core flowpath extending through the core compressor section, the core combustor section, the core turbine section and the flowpath duct from an inlet into the core flowpath to an exhaust from the core flowpath, wherein the core flowpath extends axially along the water permeable region within the flowpath duct.

2. The turbine engine of claim 1, wherein the water separator is configured to
   separate water from other combustion products flowing through the flowpath duct; and
   direct the water through the water permeable region into the collector duct.

3. The turbine engine of claim 2, further comprising a recovery system including the water separator and an evaporator, the recovery system configured to evaporate at least some the water to provide steam using the evaporator, and the recovery system configured to direct the steam to one or more components of the turbine engine core.

4. The turbine engine of claim 1, wherein the water permeable region comprises a gutter.

5. The turbine engine of claim 1, wherein
the water permeable region comprises a channel; and
the channel projects radially, in a radial outward direction, into the outer wall of the flowpath duct; and
the channel extends circumferentially about the core flowpath within the outer wall of the flowpath duct.

6. The turbine engine of claim 1, wherein the water permeable region comprises a scoop.

7. The turbine engine of claim 1, wherein the water permeable region comprises a plurality of perforations radially through the outer wall of the flowpath duct.

8. The turbine engine of claim 1, wherein the outer wall of the flowpath duct is further configured as an inner wall of the collector duct.

9. The turbine engine of claim 1, further comprising a water reservoir fluidly coupled with and downstream of the collector duct.

10. The turbine engine of claim 1, further comprising:
a first evaporator module; and
a first condenser module;
the core flowpath extending from the core turbine section, through the first evaporator module and the first condenser module, to the flowpath duct.

11. The turbine engine of claim 10, wherein
the first condenser module is radially adjacent the first evaporator module; and
the first condenser module extends axially along and circumferentially about the first evaporator module.

12. The turbine engine of claim 10, wherein
the flowpath duct is radially adjacent the first condenser module; and
the flowpath duct extends axially along and circumferentially about the first condenser module.

13. The turbine engine of claim 10, further comprising:
a second evaporator module; and
a second condenser module;
a first leg of the core flowpath extending from the core turbine section, through the first evaporator module and the first condenser module, to the flowpath duct; and
a second leg of the core flowpath extending from the core turbine section, through the second evaporator module and the second condenser module, to the flowpath duct.

14. The turbine engine of claim 13, wherein the flowpath duct extends axially along and circumferentially about the first condenser module and the second condenser module.

15. The turbine engine of claim 10, wherein at least one of
the outer wall of the flowpath duct comprises hydrophilic material; or
the first condenser module comprises hydrophobic material.

16. The turbine engine of claim 10, further comprising:
a fan section, the turbine engine core configured to power the fan section; and
a bypass flowpath fluidly coupled with and downstream of the fan section, the bypass flowpath bypassing the turbine engine core;
at least one of the first evaporator module or the first condenser module disposed radially outboard of the bypass flowpath.

17. The turbine engine of claim 1, further comprising:
a fan section, the turbine engine core configured to power the fan section; and
a bypass flowpath fluidly coupled with and downstream of the fan section, the bypass flowpath bypassing the turbine engine core;
the water separator disposed radially outboard of the bypass flowpath.

18. An assembly for a turbine engine, comprising:
a plurality of condenser modules arranged circumferentially about an axis, the plurality of condenser modules including a first condenser module and a second condenser module;
a water separator including a flowpath duct and a collector duct radially outboard of flowpath duct, the collector duct fluidly coupled with the flowpath duct through a water permeable region in an outer wall of the flowpath duct; and
a flowpath comprising a plurality of parallel legs arranged circumferentially about the axis, the plurality of parallel legs including a first leg and a second leg, the first leg extending through the first condenser module to the flowpath duct, and the second leg extending through the second condenser module to the flowpath duct.

19. The assembly of claim 18, further comprising:
a turbine engine core including a core compressor section, a core combustor section and a core turbine section; and
a portion of the flowpath, which is upstream of the plurality of parallel legs, extending through the core compressor section, the core combustor section and the core turbine section.

20. An apparatus for a turbine engine, comprising:
a water separator including a flowpath duct and a collector duct;
the flowpath duct extending axially along and circumferentially about an axis;
the collector duct extending axially along and circumferentially about the flowpath duct, the collector duct fluidly coupled with the flowpath duct through a plurality of water permeable regions in an outer wall of the flowpath duct, the plurality of water permeable regions spaced axially along the axis, and each of the plurality of water permeable regions extending circumferentially about the axis; and
the water separator configured to passively separate water from other combustion products flowing through the flowpath duct, and the water separator configured to direct the water through the plurality of water permeable regions into the collector duct.

* * * * *